United States Patent
Yeo et al.

(10) Patent No.: US 9,217,906 B2
(45) Date of Patent: Dec. 22, 2015

(54) IN-PLANE ELECTRO-OPTICAL DISPLAY

(75) Inventors: Jong-Souk Yeo, Corvallis, OR (US);
Yoocham Jeon, Palo Alto, CA (US);
Michael G. Groh, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 97 days.

(21) Appl. No.: 13/258,530

(22) PCT Filed: Nov. 6, 2009

(86) PCT No.: PCT/US2009/063602
§ 371 (c)(1),
(2), (4) Date: Sep. 22, 2011

(87) PCT Pub. No.: WO2010/110820
PCT Pub. Date: Sep. 30, 2010

(65) Prior Publication Data
US 2012/0019899 A1   Jan. 26, 2012

Related U.S. Application Data

(63) Continuation-in-part of application No. 12/411,828, filed on Mar. 26, 2009, now Pat. No. 8,018,642.

(51) Int. Cl.
*G02B 26/08* (2006.01)
*G02F 1/03* (2006.01)
(Continued)

(52) U.S. Cl.
CPC .......... *G02F 1/167* (2013.01); *G02F 1/133345* (2013.01); *G02F 2001/1676* (2013.01); *G02F 2201/122* (2013.01)

(58) Field of Classification Search
CPC ............ G02F 1/167; G02F 2001/1672; G02F 1/1334; G02F 1/133509; G02F 1/133512; G02F 1/133603; G02F 1/134309; G02F 1/139; G02F 1/19; G02F 2201/02; G02F 2201/122; G02F 2202/32; G02F 2202/36

USPC ......... 359/290–292, 295, 296, 298, 242, 237, 359/245, 247, 252, 254, 265–267, 269–273
See application file for complete search history.

(56) References Cited

U.S. PATENT DOCUMENTS 6,130,774 A  10/2000  Albert et al.
6,639,580 B1  10/2003  Kishi et al.
(Continued)

FOREIGN PATENT DOCUMENTS

JP   09-211499    8/1997
JP   2001-356374  12/2001
(Continued)

OTHER PUBLICATIONS

Extended European Search Report from the European Patent Office (EPO) for EP counterpart patent application No. EP09842440 to the above-referenced U.S. Appl. No. 13/258,530, 7 pages, dated Jul. 27, 2012.
(Continued)

*Primary Examiner* — Stephone B Allen
*Assistant Examiner* — Brandi Thomas
(74) *Attorney, Agent, or Firm* — Dicke, Billig & Czaja

(57) ABSTRACT

In one embodiment, a display element includes a first electrode; a dielectric layer having recessed regions therein over the first electrode; a second electrode disposed on the dielectric layer; and a fluid with colorant particles within the display element, wherein a voltage signal applied to the first electrode and the second electrode controls movement of the colorant particles such that a first voltage signal provides a first optical state by compacting the colorant particles into the recessed regions and a second voltage signal provides a second optical state by spreading the colorant particles in the fluid.

18 Claims, 15 Drawing Sheets

(51) Int. Cl.
*G02F 1/07* (2006.01)
*G02F 1/167* (2006.01)
*G02F 1/1333* (2006.01)

(56) References Cited

U.S. PATENT DOCUMENTS

| | | | |
|---|---|---|---|
| 6,741,385 B2 | 5/2004 | Ikeda et al. | |
| 6,781,745 B2 | 8/2004 | Chung et al. | |
| 6,822,783 B2 | 11/2004 | Matsuda et al. | |
| 7,372,203 B2 * | 5/2008 | Jang et al. | 313/582 |
| 2002/0041423 A1 * | 4/2002 | Ogawa | 359/272 |
| 2003/0011869 A1 | 1/2003 | Matsuda et al. | |
| 2003/0117016 A1 * | 6/2003 | Ukigaya | 305/107 |
| 2006/0114189 A1 * | 6/2006 | Lee et al. | 345/75.2 |
| 2007/0211330 A1 | 9/2007 | Ohshima | |
| 2007/0268245 A1 | 11/2007 | Sugita et al. | |
| 2008/0024432 A1 * | 1/2008 | Lee et al. | 345/107 |
| 2008/0259003 A1 * | 10/2008 | Lim | 345/71 |
| 2011/0085224 A1 * | 4/2011 | Addington et al. | 359/296 |

FOREIGN PATENT DOCUMENTS

| | | |
|---|---|---|
| JP | 2003-005225 | 1/2003 |
| JP | 2003-005226 | 1/2003 |
| JP | 2003-330048 | 11/2003 |
| JP | 2004-020818 | 1/2004 |
| JP | 2005265921 | 9/2005 |
| JP | 2007310182 | 11/2007 |
| KR | 10-2006-0093900 | 8/2006 |
| KR | 10-2009-0027386 | 3/2009 |
| WO | WO-2008007302 | 1/2008 |

OTHER PUBLICATIONS

List of References Cited by Japan Patent Office (JPO) for counterpart JP patent application No. 2012-501985, HP Record ID 82833772 in JP Office Action dated Jan. 28, 2013 and mailed to JP Foreign Associate on Feb. 5, 2013 (1 page).

International Search Report and the Written Opinion of the International Searching Authority, or the Declaration for PCT/US2009/063602 dated Jun. 28, 2010 (12 pages).

The International Bureau of WIPO, International Preliminary Report on Patentability (Chapter I of the Patent Cooperation Treaty) for PCT/US2009/063602 dated Oct. 6, 2011.

* cited by examiner

IN-PLANE ELECTRO-OPTICAL DISPLAY

CROSS-REFERENCE TO RELATED APPLICATIONS

This Application is a national stage application under 35 U.S.C. 371 of PCT/US2009/063602, filed Nov. 6, 2009, which is a continuation-in-part of U.S. patent application Ser. No. 12/411,828, entitled "ELECTRO-OPTICAL DISPLAY," filed Mar. 26, 2009, now U.S. Pat. No. 8,018,642, which is incorporated herein by reference.

BACKGROUND

Electrophoresis is the translation of charged objects in a fluid in response to an electric field. Electrophoretic inks are useful as a medium to enable bistable, low power types of displays. Electrophoretic displays have been developed using a clear fluid with two differently colored particles of opposite charge (e.g., positively charged white particles and negatively charged black particles) sandwiched between parallel electrodes on top and bottom substrates. When the electrode on the viewing side is charged negatively, the positively charged white particles are translated to the viewing surface, and the display appears white. When the electrode on the viewing side is charged positively, the negatively charged black particles are translated to the viewing surface, and the display appears black. A transparent state can be enabled by "in-plane" electrophoretic displays, in which electrodes are arranged to apply electric fields that are substantially parallel to the substrates to translate colorant particles through a clear fluid parallel to the substrates. This allows the colorant particles to be collected out of the viewing area of the display to create a transparent state. While electrophoresis enables electronic switching, conventional applications that use electrophoretic inks have been hampered by limited mobility and hydrodynamic instability. Using transparent conductor layers on both sides of an electro-optical display incorporating out of plane electrodes may reduce the optical contrast due to absorption in the transparent conductor layers. In addition, there is an increased cost associated with a transparent conductor coated substrate.

DETAILED DESCRIPTION

Figure 1:
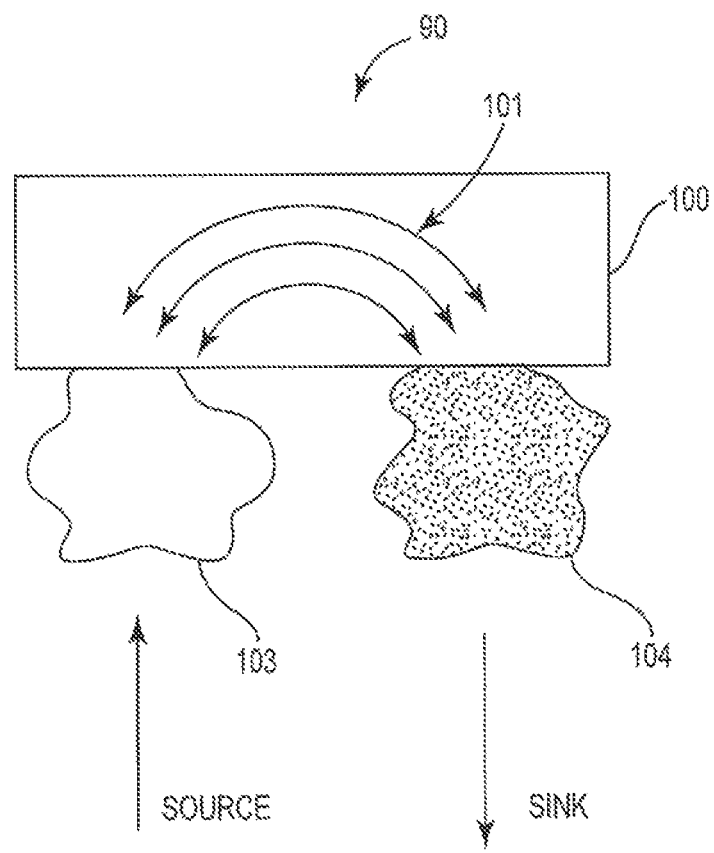
FIG. 1 is a diagram illustrating one embodiment of convective flow of colorant particles in a fluid of an electro-optical display.

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "electro-optical display" is an information display that forms visible images using one or more of electrophoresis, electro-convection, electrochemical interactions, and/or other electrokinetic phenomena. The term "electro-optical display" is used interchangeably with the term "electrokinetic display."

Embodiments provide in-plane electro-optical displays where electrodes are defined on the same substrate side and separated by a dielectric layer. The electrodes induce an electro-convective flow with electrochemical interaction of the charged colorant particles. In one embodiment, the electro-optical display includes a continuous or blanket first electrode layer with a structured dielectric layer on top of the first electrode layer. A second, structured electrode layer is formed on top of the dielectric layer. Fluid communication between the exposed portions of the first electrode and the second electrode induce electro-convective flow initiated by electrophoretic motion of the charged colorant particles. This allows the compaction of colorant particles within reservoirs patterned into the dielectric layer on top of the first electrode.

In another embodiment, the electro-optical display includes a segmented first electrode and a segmented second electrode interposed between the segments of the first electrode. A structured dielectric layer is formed on top of the first and second electrodes. Fluid communication between the exposed portions of the first electrode and the second electrode induce electro-convective flow initiated by electrophoretic motion of the charged colorant particles. This allows the compaction of colorant particles within reservoirs patterned into the dielectric layer on top of the first and second electrodes.

The embodiments of the present disclosure encompass display elements having an energy gradient that induces a convective flow according to a defined pattern. The convective flow can be controlled so as to move a colorant species that is affected by such an energy source. The energy gradient is induced by methods including mechanical force, a temperature gradient, a chemical potential gradient, a concentration gradient, or other suitable disturbances. The present embodiments can be manifested in an electro-optical application where a means for inducing a convective flow includes electrodes, electrokinetic elements, heating elements, microfluidic elements, micro-electromechanical elements, or chemical reactions. Means for controlling the convective flow (e.g., a patterned electrode and/or a patterned dielectric layer to expose part of the electrodes) provides an energy transfer, such as charge transfer, to control the convective flow of the colorant species and thus the speed and direction of the species.

The display elements subsequently described use both out-of-plane movement as well as in-plane movement of colorant particles to provide the desired optical appearance. Electrokinetic principles of electro-convection, electrochemical interaction, and electrophoresis are used for an electro-optical display to move charged colorant particles in a carrier fluid within a display element. A display element can be a pixel, a sub-pixel, a super-pixel, a segment, or other suitable display element.

In general, a colorant particle may have a size between several nanometers and several microns and has the property of changing the spectral composition of the incident light by absorbing and/or scattering certain portions of the spectrum. As a result, the particle appears colored, which provides a desired optical effect. In other embodiments, the colorant can be a dye, which is comprised of single absorbing molecules.

FIG. 1 is a diagram illustrating one embodiment of convective flow of colorant particles in a fluid of an electro-optical display element 90. Display element 90 is a segment, a pixel, a sub-pixel, a super pixel (i.e., more than one pixel), or another suitable display element. Display element 90 includes a source 103 from which the colorant particles enter the element display volume 100 and a sink 104 to which the colorant particles flow. During display element 90 operation, the roles of source and sink can be reversed. In other words, the source can become the sink and vice versa. The flow lines 101 illustrate the movement of the colorant particles from the source 103 to the sink 104 as described by the convective movement of the carrier fluid.

The convective currents of display element 90 can be generated in numerous ways. Convection is macroscopic movement of molecules in fluids including liquids and gases. Convection is generated by unbalanced volumetric forces inside the fluids that cause different parts of the fluid to move relative to each other producing convective currents. Convection can occur under gravity if different parts of the fluid have different density caused, for example, by localized heating. Convection can also occur if there are pressure or concentration gradients inside the fluid produced by localized chemical reactions, localized heating, or other suitable disturbances. Convection can also occur if there are ionic currents in the fluid caused by external electric fields (AC or DC) and charge injection into the fluid. The moving ions then create the pressure gradient through viscous drag and excluded volume effects. Such convection is typically termed electro-convection.

Figure 2A:
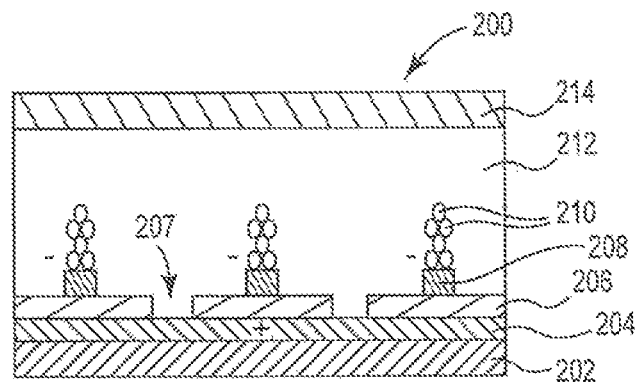
FIG. 2A illustrates a cross-sectional view of one embodiment of a clear optical state of an electro-optical display element.

FIG. 2A illustrates a cross-sectional view of one embodiment of a clear optical state of an electro-optical display element 200. Electro-optical display element 200 includes a first substrate 202, a first electrode 204, a dielectric layer 206 including recess regions 207, a second electrode 208, colorant particles 210, a display volume 212, and a second substrate 214. In this embodiment, first electrode 204 is a continuous, blanket, or solid plate electrode formed on substrate 202. A dielectric layer is formed on first electrode 204 and structured to provide dielectric layer 206. Dielectric layer 206 is structured with recess regions 207 that allow the charged colorant particles to compact. Second electrode 208 is formed on dielectric layer 206. In one embodiment, second electrode 208 is a segmented electrode.

Electro-optical display element 200 includes first electrode 204 as the conceptual "sink" of FIG. 1 and second electrode 208 as the conceptual "source" of FIG. 1. One or both of first electrode 204 and second electrode 208 may be transparent or opaque. In one embodiment, "sink" electrode 204 is formed on a substrate that, in one embodiment, is coated with a continuous film of transparent conductive material. The transparent conductive material can include carbon nanotube layers, a transparent conducting oxide such as ITO (Indium Tin Oxide), or a transparent conducting polymer such as PEDOT (poly 3,4-ethylenedioxythiophene). Other embodiments can use other materials that provide suitable conductivity and transparency for display element 200. In another embodiment, substrate 202 can be coated with or comprised of a reflective material. In yet another embodiment, substrate 202 can be an opaque material. In still another embodiment, a light scatterer can be formed on substrate 202.

A layer of transparent electrically insulating material (i.e., dielectric material) is deposited on first electrode 204. The dielectric layer is patterned to create recessed regions 207 in dielectric layer 206 on first electrode 204. The recessed regions can be manufactured by many different processes. These processes include embossing or imprinting with a master or stamp, photolithography, or etching of the dielectric layer. The recessed regions can be any suitable size and/or shape.

In another embodiment, electrodes are only defined within the recessed regions of dielectric layer 206. In such an embodiment, dielectric layer 206 is deposited and patterned on top of the insulating substrate first, and then the electrodes are formed inside the recess areas, for example by electroless deposition or by another suitable method. In another embodiment, first electrode layer 204 is patterned into a collection of electrodes first, and then dielectric layer 206 is deposited and recess areas 207 are formed directly on top of the electrodes. The alignment for the latter operation can be achieved for example by photolithography.

"Source" electrode 208 is formed on dielectric layer 206. Electrode 208 may be formed by embossing, imprinting, molding, or photolithography of materials such as photoresists or embossing resins. Display element 200 is completed by the formation of second substrate 214 that is formed a fixed distance apart from second electrode 208 to thus form display volume 212 that holds the carrier fluid. The substrate 214 is held at the fixed distance by a network of mechanical stops (not shown) that may include posts, walls, and/or spacer beads. The mechanical stops may be formed by embossing, imprinting, molding, or photolithography of materials such as photoresists or embossing resins.

The carrier fluid of electro-optical display 200, as well as the subsequently described embodiments, can include either polar fluids (e.g. water) or nonpolar fluids (e.g., dodecane). Additionally, anisotropic fluids such as liquid crystal can be used. The fluid may include surfactants such as salts, charging agents, stabilizers, and dispersants. In one embodiment, the surfactants provide a fluid that is an electrolyte that is able to sustain current by ionic mass transport.

Colorant particles 210 in the carrier fluid are comprised of a charged material in the case of an electro-convective display. The colorant particle material should be able to hold a stable charge indefinitely so that repeated operation of the element does not affect the charge on the colorant particles. Colorant particle materials having a finite ability to hold a stable charge, however, can be used in accordance with the various embodiments while they maintain their charge.

In operation, positively charged colorant particles 210 can be electrophoretically and convectively moved to second electrode 208 and held there by a negative bias or voltage signal applied to second electrode 208 relative to first electrode 204 for a clear optical state. This results in a clear aperture as illustrated in FIG. 2A.

In one embodiment, the convective flow is induced by ionic mass transport in the carrier fluid and charge transfer between the carrier fluid and the electrodes. The charge transfer can occur when the carrier fluid is coupled to the electrodes either through direct contact with the electrodes or separated from the electrodes by an intermediate layer including one or more materials. In the latter case, charge transfer is facilitated by the internal electrical conductivity of the intermediate layer, either volumetric or via pinholes and other defects.

In another embodiment, the convective flow is a transient effect caused by the ionic mass transport in the carrier fluid, but without charge transfer between the carrier fluid and the electrode. In this case, the convective flow proceeds for a finite amount of time and facilitates the compaction of the colorant particles on second electrode 208. After that the colorant particles are held on second electrode 208 by electrostatic forces generated by a coupling with the electrodes.

Convection within the display element can also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

Figure 2B:
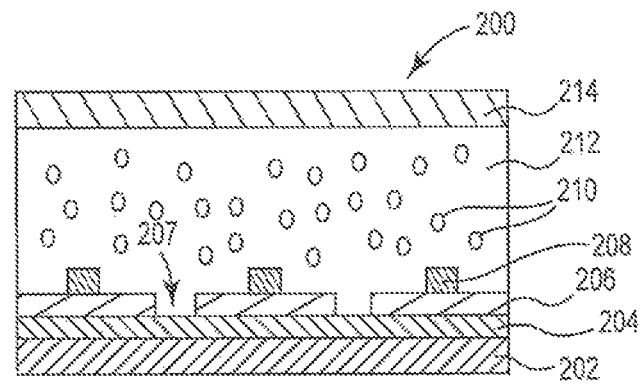
FIG. 2B illustrates a cross-sectional view of one embodiment of a dark optical state of an electro-optical display element.

FIG. 2B illustrates a cross-sectional view of one embodiment of a dark optical state of electro-optical display element 200. To switch the display element from the clear optical state to the dark optical state, no bias is applied or a brief reverse or pulsed bias or voltage signal is applied to first electrode 204 relative to second electrode 208. This induces convective flow and the colorant particles are no longer electrically held to second electrode 208. As a result, the colorant particles 210 are mass transported to the display volume 212 and then spread relatively evenly throughout display volume 212. In the dark optical state of display element 200, the colorant particles 210 are relatively uniformly distributed across the element's display volume 212 to absorb the incident light and create the dark optical appearance.

Figure 2C:
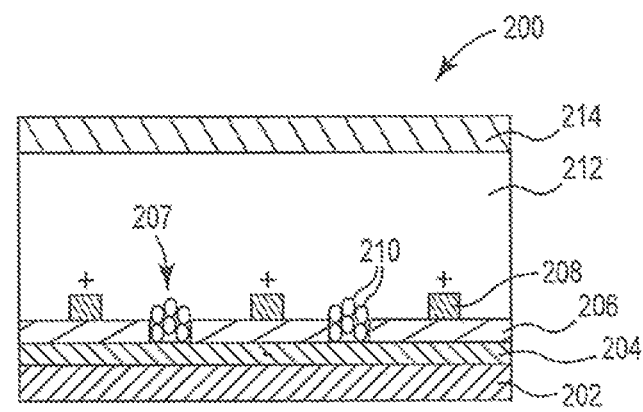
FIG. 2C illustrates a cross-sectional view of one embodiment of a clear optical state of an electro-optical display element.

FIG. 2C illustrates a cross-sectional view of one embodiment of a clear optical state of electro-optical display element 200. To switch display element 200 to another clear optical state, a bias or voltage signal of reverse polarity is applied to second electrode 208 relative to first electrode 204. This results in a clearing of the main aperture of display element 200 by compacting colorant particles 210 in recess regions 207 of dielectric layer 206. Therefore, electro-optical display 200 can achieve two different clear states and a dark state.

The depth of recesses 207 in dielectric layer 206 can be defined by the following:

$$h_m = \frac{L}{L_m - L} \cdot \frac{d}{1-P} \quad \text{Equation 1}$$

where:
L is the colorant particle load by volume;
$L_m$ is the maximum closed packed colorant particle load by volume;
d is the thickness of the main element display volume; and
P is the aperture ratio on dielectric layer defined by $1-A_0/A$.

The quantity A is the area of the element display volume while $A_0$ is the recess area. The total area of the defined recess regions of the first electrodes is sufficiently less than the area of the display element to provide optical contrast between the collected or clear particle state and the spread particle state or grayscale state.

In one embodiment, the total area of the defined recess regions of the first electrodes is between 1% and 10% of the area of the display element, in order to maximize the optical contrast between the clear and the dark or grayscale states. The present embodiments, however, are not limited to any predefined aperture ratio. For example, another embodiment might have a total area of the recessed regions being between 10% and 20% of the area of the display element. Still another embodiment might have a total area of the recessed regions being between 20% and 50% of the area of the display element. Other embodiments might have a total area of the recessed regions being greater than 50% of the area of the display element for embodiments where low optical contrast is desired.

In additional embodiments, a grayscale of display element 200 can be controlled by one of: an aperture ratio, a density of recess regions that are electrically active, or a depth of recess regions that are electrically active. These approaches enable geometrical control over how the colorant particles are spread throughout the display volume and collected in the recess regions through variations in the sizes of the recess regions, the spacing between the recess regions, and the depth of the recess regions. In one embodiment, the aperture ratio P and the recess depth can be adjusted to maximize the optical contrast between the clear and the dark or grayscale optical states.

The present embodiments subsequently refer to a dot structure for the recess regions or other methods for selectively patterning the dielectric on at least one of the electrodes. A dot, for purposes of the present embodiments, can be any shape and/or size as long as it satisfies the requirements for the optical contrast and other characteristics of the display element.

Figure 3A:
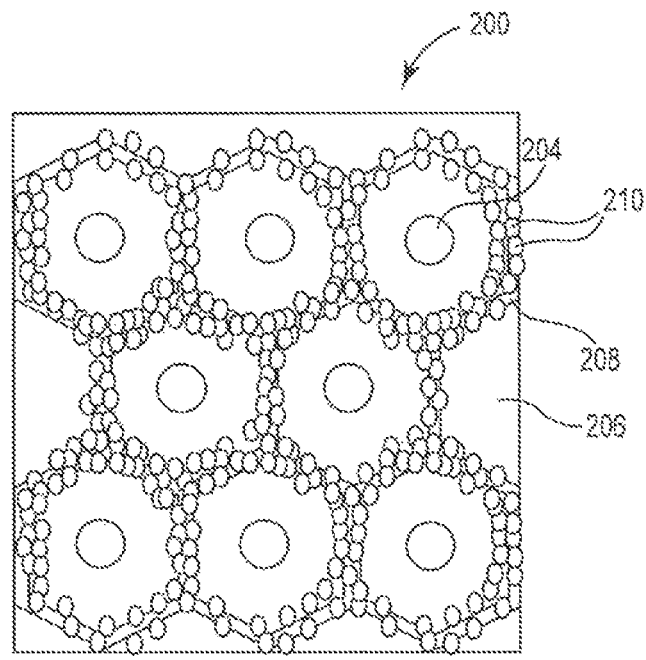
FIG. 3A illustrates a top view of one embodiment of a clear optical state of an electro-optical display element.

FIG. 3A illustrates a top view of one embodiment of a clear optical state of electro-optical display element 200. In one embodiment, recess regions 207 expose dot shaped regions of first electrode 204 and second electrode 208 is structured in a hexagonal lattice pattern. Each hexagon of the lattice pattern of second electrode 208 surrounds a dot shaped region of first electrode 204 and is separated from first electrode 204 by dielectric layer 206. In the clear optical state as previously described and illustrated with reference to FIG. 2A, colorant particles 210 are compacted onto second electrode 208 as illustrated in FIG. 3A.

Figure 3B:
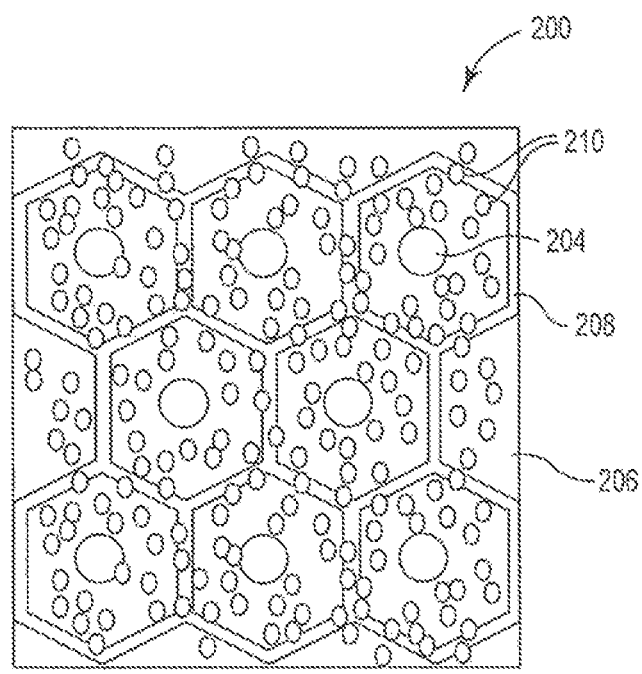
FIG. 3B illustrates a top view of one embodiment of a dark optical state of an electro-optical display element.

FIG. 3B illustrates a top view of one embodiment of a dark optical state of electro-optical display element 200. In the dark optical state as previously described and illustrated with reference to FIG. 2B, colorant particles 210 are mass transported to the display volume and then spread relatively evenly throughout the display volume as illustrated in FIG. 3B.

Figure 3C:
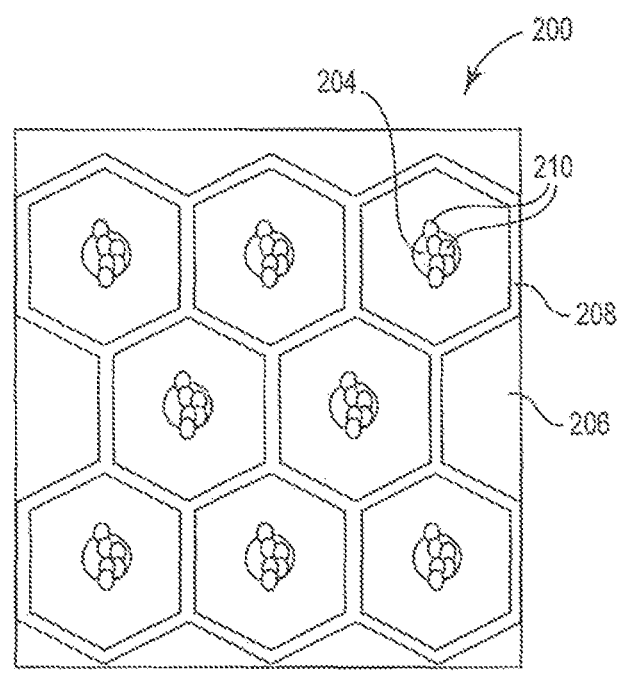
FIG. 3C illustrates a top view of one embodiment of a clear optical state of an electro-optical display element.

FIG. 3C illustrates a top view of one embodiment of a clear optical state of electro-optical display element 200. In the clear optical state as previously described and illustrated with reference to FIG. 2C, colorant particles 210 are compacted in the recess regions onto first electrode 204 as illustrated in FIG. 3C.

Electro-optical display element 200 may also be configured to be driven via a number of different addressing schemes, such as, e.g., passive matrix addressing, active matrix addressing, or direct drive addressing.

Figure 4:
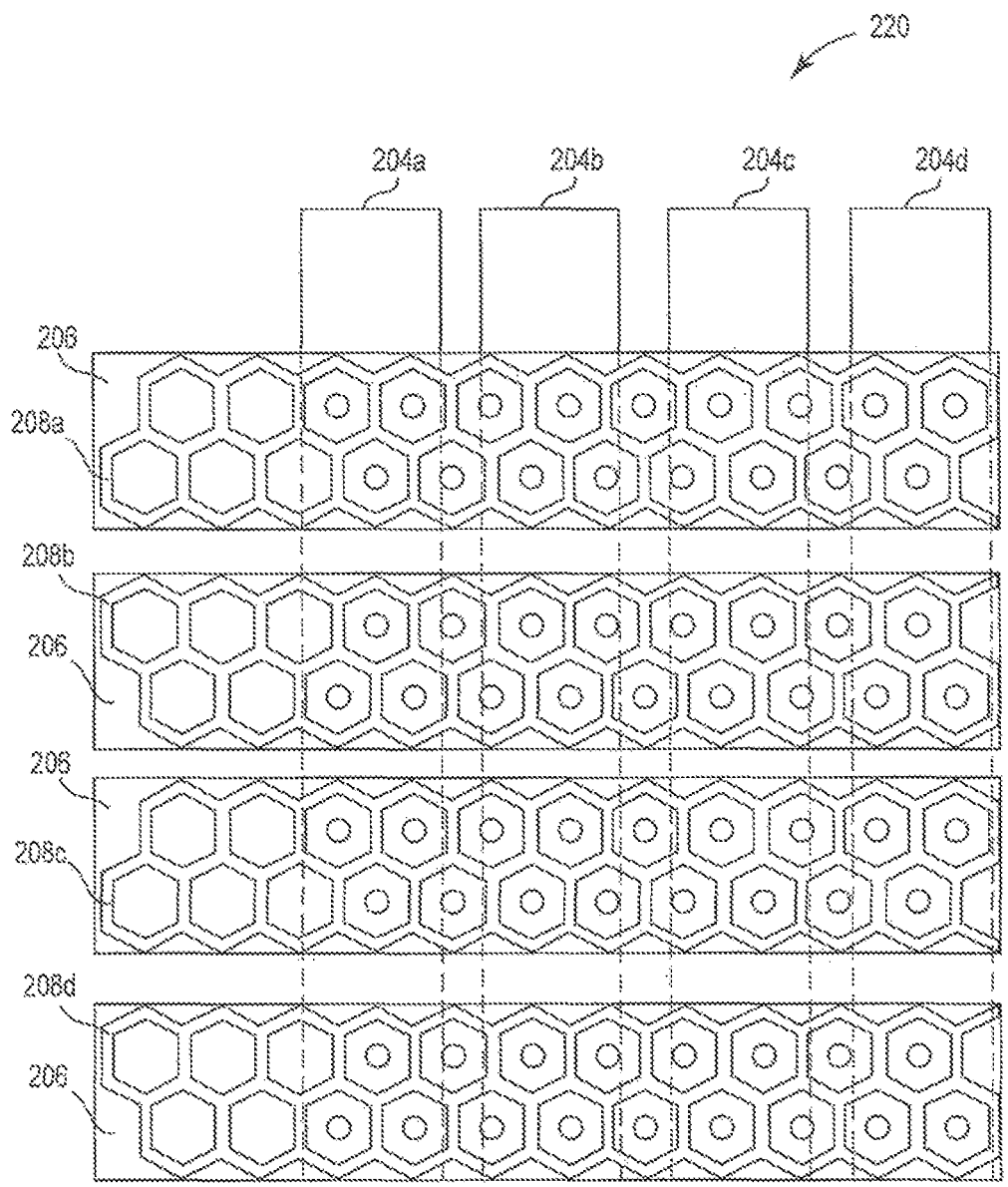
FIG. 4 illustrates a top view of one embodiment of an electro-optical display including select lines and data lines for addressing the electro-optical display.

FIG. 4 illustrates a top view of one embodiment of an electro-optical display 220 including select lines 208a-208d and data lines 204a-204d for addressing the electro-optical display. Electro-optical display 220 illustrated in FIG. 4 is an example of a display that uses passive addressing to form visible images. During passive addressing, selected rows of the display elements 220 are written with optical states determined by an electric potential difference between select lines 208a-208d and data lines 204a-204d.

In one embodiment, electro-optical display 220 is similar to electro-optical display 200 previously described and illustrated with reference to FIGS. 2A-3C, except that in electro-optical display 220 the first electrode 204 and the second electrode 208 are structured to provide data lines 204a-204d and select lines 208a-208d.

Dielectric material layer 206 is between data lines 204a-204d and select lines 208a-208d. In one embodiment, data lines 204a-204d are perpendicular to select lines 208a-208d. The intersection of each data line 204a-204d and each select line 208a-208d defines a section of electro-optical display 220. Bias or voltage signals may be individually applied to each of data lines 204a-204d and select lines 208a-208d to individually control each section of electro-optical display 220.

In another embodiment, electro-optical display 200 may use active addressing to form visible images. The display element 200 may be actively addressed by connecting one of the first or second electrodes with a transistor or other switching device that controls optical state while the other electrode is connected to a reference bias state.

Another example of a display may include one that is directly addressed. In direct addressing, each display element 200 is a segment individually driven by its own data line. Segmented display elements may have arbitrary shapes and may not be organized in a repeating array.

Figure 5:
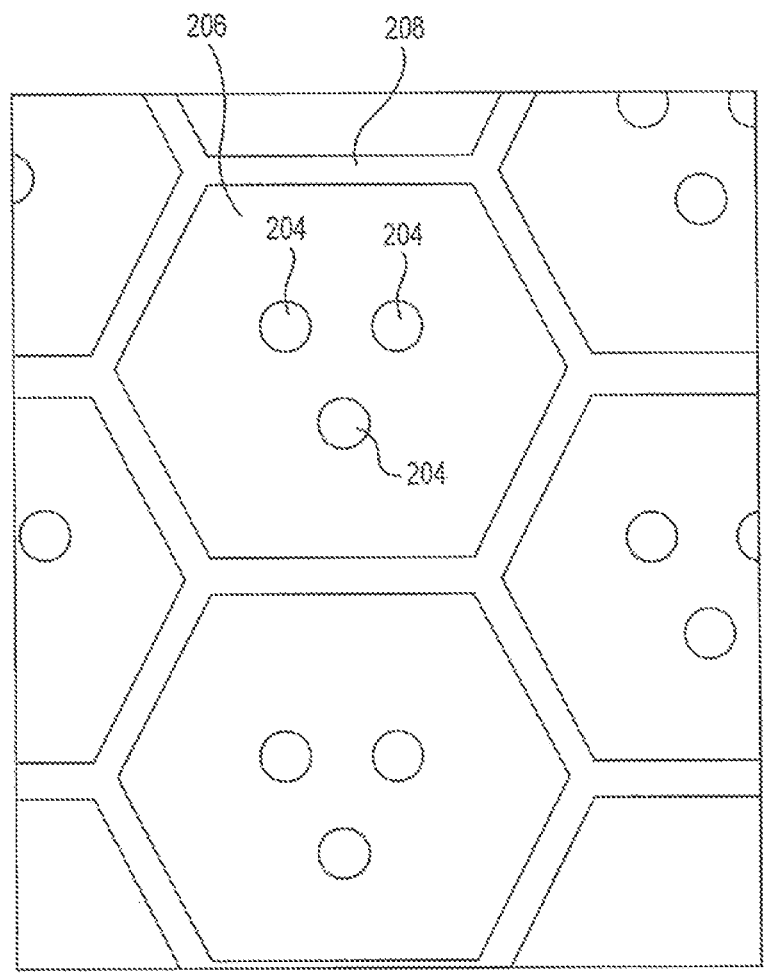
FIG. 5 illustrates a top view of another embodiment of the first electrode, the structured dielectric layer, and the second electrode.

FIG. 5 illustrates a top view of another embodiment of first electrode 204, structured dielectric layer 206, and second electrode 208. In this embodiment, three dot shaped recess regions are formed in structured dielectric layer 206 to expose first electrode 204 within each hexagon of the lattice pattern of second electrode 208. In other embodiments, another suitable number of dot shaped recess regions are formed in structured dielectric layer 206 within each hexagon of the lattice pattern of second electrode 208. In other embodiments, the lattice pattern of second electrode 208 is based on another suitable shape rather than the hexagon, and the dot shaped recess regions are replaced with another suitable shape.

The following FIGS. 6A-7B illustrate other embodiments for the structure of dielectric layer 206 and second electrode 208 of an electro-optical display element. While these embodiments are illustrated and described, other suitable structures for first electrode 204, dielectric layer 206, and second electrode 208 can also be used.

Figure 6A:
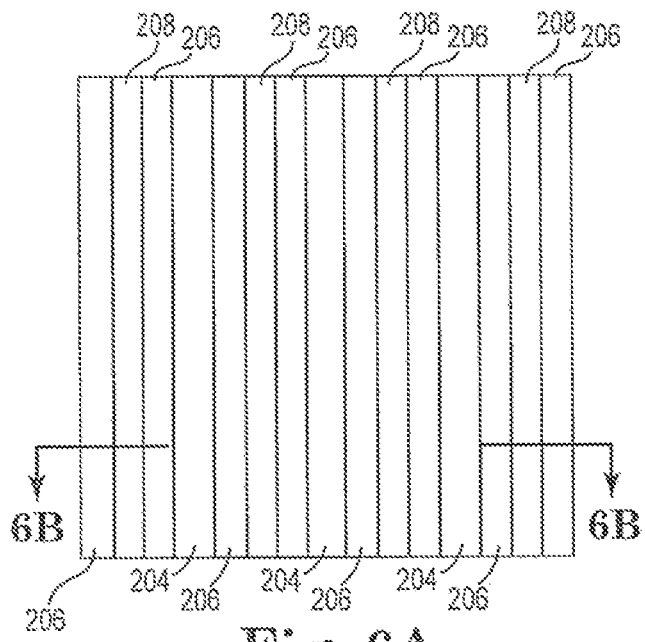
FIG. 6A illustrates a top view of another embodiment of the substrate, the first electrode, the structured dielectric layer, and the second electrode.
Figure 6B:
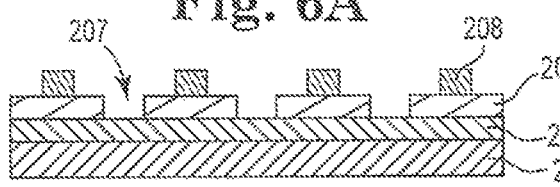
FIG. 6B illustrates a cross-sectional view of another embodiment of the substrate, the first electrode, the structured dielectric layer, and the second electrode.

FIG. 6A illustrates a top view and 6B illustrates a cross-sectional view of another embodiment of substrate 202, first electrode 204, structured dielectric layer 206, and second electrode 208. In this embodiment, dielectric layer 206 is structured to include trench recess regions 207 exposing lines of first electrode 204. In addition, the second electrode is also structured to form lines of segmented second electrode 208. The lines of segmented second electrode 208 are parallel to the exposed lines of first electrode 204.

Figure 7A:
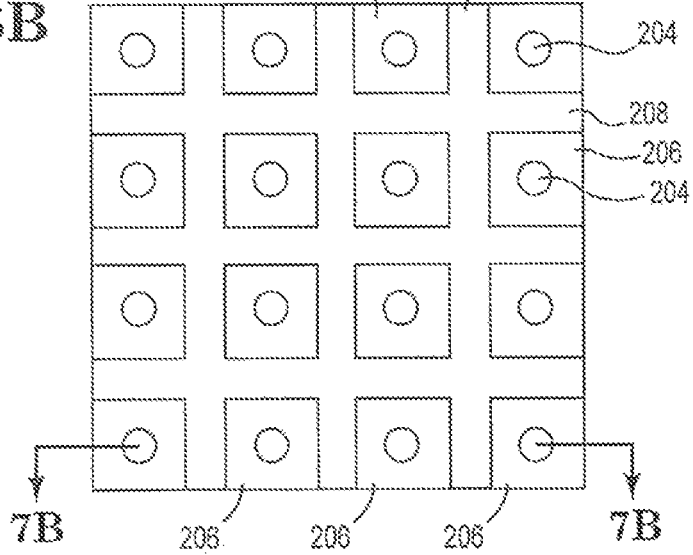
FIG. 7A illustrates a top view of another embodiment of the substrate, the first electrode, the structured dielectric layer, and the second electrode.
Figure 7B:
FIG. 7B illustrates a cross-sectional view of another embodiment of the substrate, the first electrode, the structured dielectric layer, and the second electrode.

FIG. 7A illustrates a top view and FIG. 7B illustrates a cross-sectional view of another embodiment of substrate 202, first electrode 204, structured dielectric layer 206, and second electrode 208. In this embodiment, dielectric layer 206 is structured to include dot recess regions 207 exposing dots of first electrode 204. In addition, the second electrode is structured to form a square lattice patterned electrode where each square of the lattice pattern surrounds a dot recess region 207.

Figure 8A:
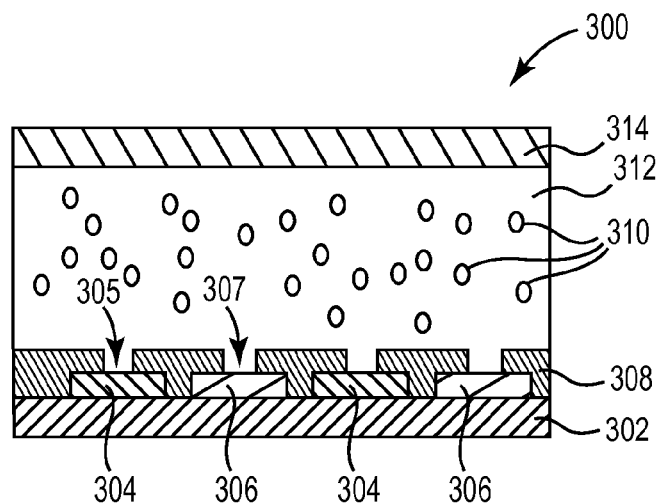
FIG. 8A illustrates a cross-sectional view of one embodiment of a dark optical state of an electro-optical display element.

FIG. 8A illustrates a cross-sectional view of one embodiment of a dark optical state of an electro-optical display element 300. Electro-optical display element 300 includes a first substrate 302, a first electrode 304, a second electrode 306, a dielectric layer 308 including recess regions 305 and 307, colorant particles 310, a display volume 312, and a second substrate 314.

In this embodiment, first electrode 304 is a segmented electrode formed on substrate 302, and second electrode 306 is a segmented electrode formed on substrate 302. The segments of first electrode 304 are interposed between the segments of second electrode 306. In another embodiment, each segment of first electrode 304 and/or second electrode 306 can be divided into multiple segments such that there are two or more segments of first electrode 304 and/or second electrode 306 adjacent to each other. A dielectric layer is formed on substrate 302, first electrode 304, and second electrode 306 and structured to provide dielectric layer 308. Dielectric layer 308 is structured with recess regions 305 that allow charged colorant particles 310 to compact on first electrode 304 and recess regions 307 that allow charged colorant particles 310 to compact on second electrode 306.

In operation, to switch the display element to the dark optical state, no bias is applied or a brief pulsed bias or voltage signal is applied to first electrode 304 relative to second electrode 306. This induces convective flow and the colorant particles are not electrically held to first electrode 304 or second electrode 306. As a result, the colorant particles 310 are mass transported to the display volume 312 and then spread relatively evenly throughout display volume 312. In the dark optical state of display element 300, the colorant particles 310 are relatively uniformly distributed across the element's display volume 312 to absorb the incident light and create the dark optical appearance.

Figure 8B:
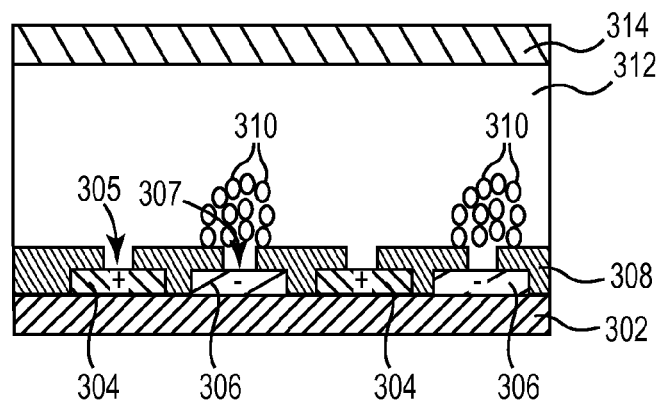
FIG. 8B illustrates a cross-sectional view of one embodiment of a transitional optical state of an electro-optical display element.

FIG. 8B illustrates a cross-sectional view of one embodiment of a transitional optical state of electro-optical display element 300. To switch display element 300 to a clear optical state for positively charged colorant particles 310, a negative bias or voltage signal is applied to second electrode 306 relative to first electrode 304. This initiates a clearing of the main aperture of display element 300 as illustrated in FIG. 8B. In one embodiment, this transitional optical state can be maintained by using a pulse signal to provide a grayscale optical state for electro-optical display element 300.

Figure 8C:
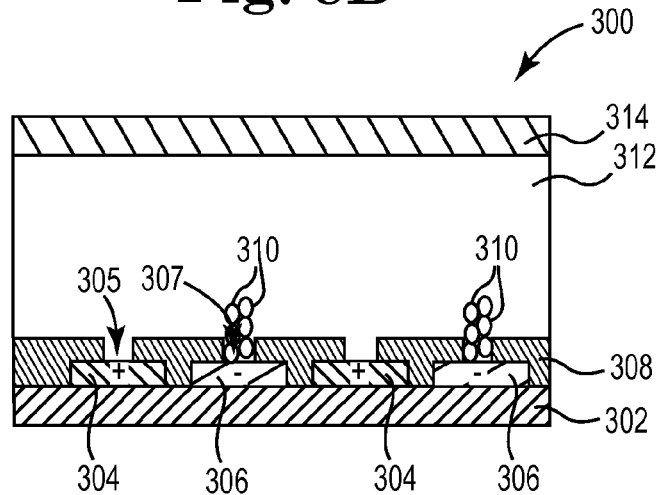
FIG. 8C illustrates a cross-sectional view of one embodiment of a clear optical state of an electro-optical display element.

FIG. 8C illustrates a cross-sectional view of one embodiment of a clear optical state of electro-optical display element 300. To switch display element 300 to a clear optical state, the negative bias or voltage signal is maintained at second electrode 306 relative to first electrode 304. This results in a clearing of the main aperture of display element 300 by compacting colorant particles 310 in recess regions 307 of dielectric layer 308. In the clear optical state, positively charged colorant particles 310 are electrophoretically and convectively moved to second electrode 306 and held there by the negative bias or voltage signal on second electrode 306.

In another embodiment, for negatively charged colorant particles 310, the main aperture of display element 300 is cleared by compacting colorant particles 310 in recess regions 305 of dielectric layer 308. In the clear optical state, the negatively charged colorant particles are electrophoretically and convectively moved to first electrode 304 and held there by the positive bias or voltage signal on first electrode 304.

The following FIGS. 9A-13B illustrate other embodiments for the structure of first electrode 304, second electrode 306, and dielectric layer 308 of an electro-optical display element. While these embodiments are illustrated and described, other suitable structures for first electrode 304, second electrode 306, and dielectric layer 308 can also be used.

Figure 9A:
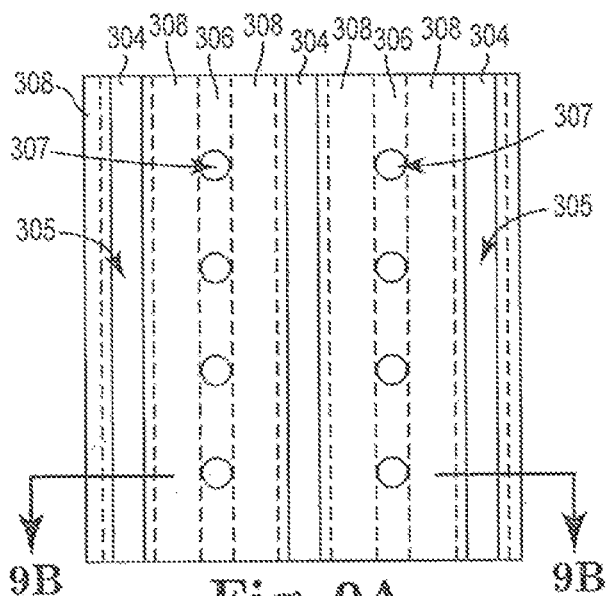
FIG. 9A illustrates a top view of another embodiment of the substrate, the first electrode, the second electrode, and the structured dielectric layer.
Figure 9B:
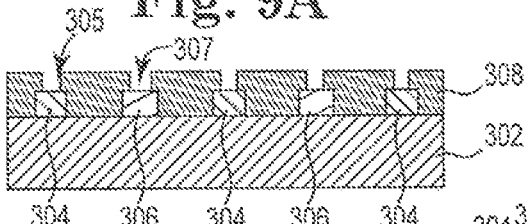
FIG. 9B illustrates a cross-sectional view of another embodiment of the substrate, the first electrode, the second electrode, and the structured dielectric layer.

FIG. 9A illustrates a top view and FIG. 9B illustrates a cross-sectional view of another embodiment of substrate 302, first electrode 304, second electrode 306, and structured dielectric layer 308. First electrode 304 includes segmented lines of conductive material interposed between segmented lines of conductive material of second electrode 306. In this embodiment, dielectric layer 308 is structured to include trench recess regions 305 exposing lines of segmented first electrode 304 and dot recess regions 307 exposing dots of segmented second electrode 306.

Figure 10A:
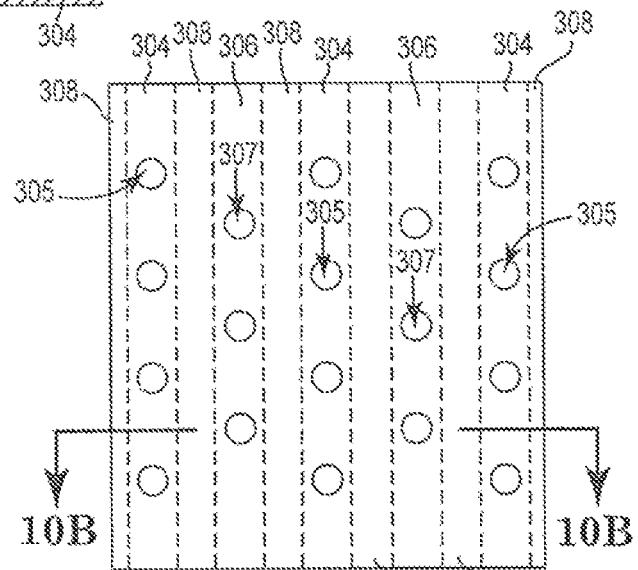
FIG. 10A illustrates a top view of another embodiment of the substrate, the first electrode, the second electrode, and the structured dielectric layer.
Figure 10B:
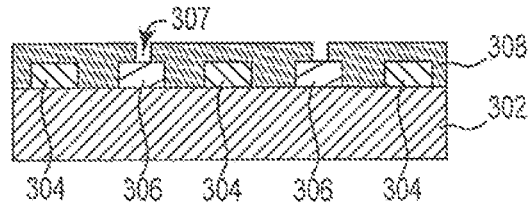
FIG. 10B illustrates a cross-sectional view of another embodiment of the substrate, the first electrode, the second electrode, and the structured dielectric layer.

FIG. 10A illustrates a top view and FIG. 10B illustrates a cross-sectional view of another embodiment of substrate 302, first electrode 304, second electrode 306, and structured dielectric layer 308. First electrode 304 includes segmented lines of conductive material interposed between segmented lines of conductive material of second electrode 306. The width of each segmented line of first electrode 304 is substantially equal to the width of each segmented line of second electrode 306. In this embodiment, dielectric layer 308 is structured to include dot recess regions 305 exposing dots of segmented first electrode 304 and dot recess regions 307 exposing dots of segmented second electrode 306. Dot recess regions 305 may be offset from dot recess regions 307.

Figure 11A:
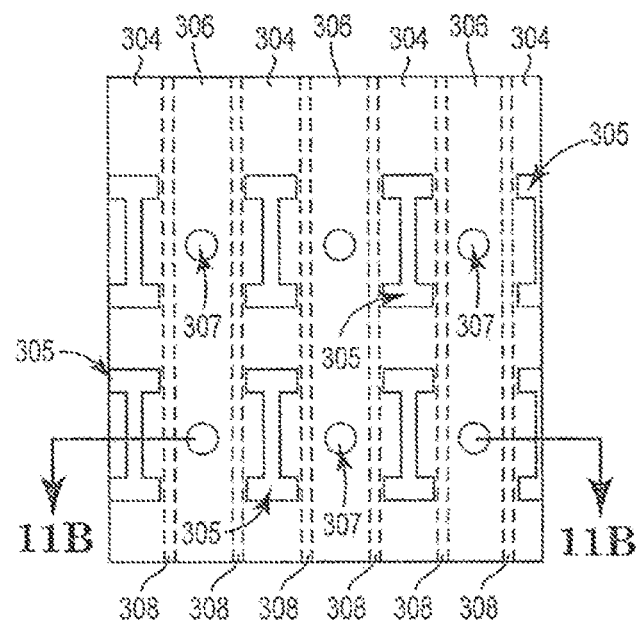
FIG. 11A illustrates a top view of another embodiment of the substrate, the first electrode, the second electrode, and the structured dielectric layer.
Figure 11B:
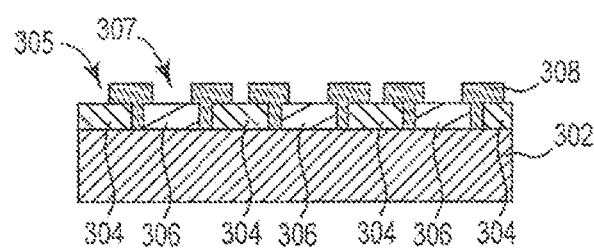
FIG. 11B illustrates a cross-sectional view of another embodiment of the substrate, the first electrode, the second electrode, and the structured dielectric layer.

FIG. 11A illustrates a top view and FIG. 11B illustrates a cross-sectional view of another embodiment of substrate 302, first electrode 304, second electrode 306, and structured dielectric layer 308. First electrode 304 includes segmented lines of conductive material interposed between segmented lines of conductive material of second electrode 306. In this embodiment, dielectric layer 308 is structured to include I-shaped recess regions 305 exposing I-shaped regions of segmented first electrode 304 and dot recess regions 307 exposing dots of segmented second electrode 306. Dot recess regions 307 are substantially centered between I-shaped recess regions 305. In another embodiment, the dot recess regions can be made of more than one dot.

Figure 12A:
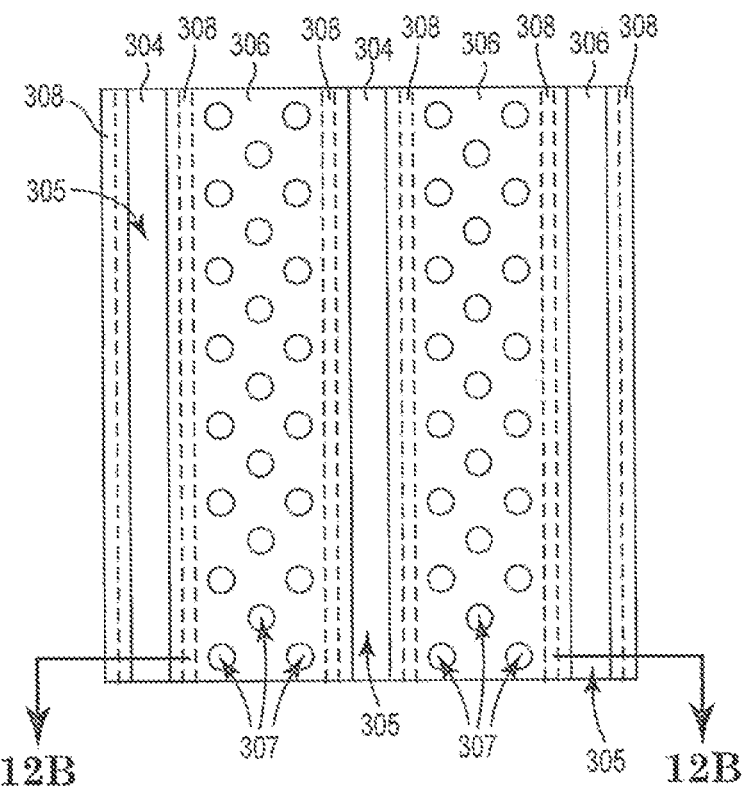
FIG. 12A illustrates a top view of another embodiment of the substrate, the first electrode, the second electrode, and the structured dielectric layer.
Figure 12B:
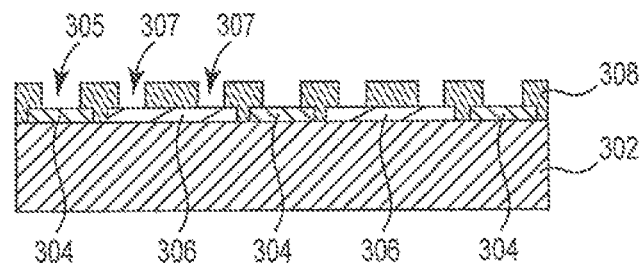
FIG. 12B illustrates a cross-sectional view of another embodiment of the substrate, the first electrode, the second electrode, and the structured dielectric layer.

FIG. 12A illustrates a top view and FIG. 12B illustrates a cross-sectional view of another embodiment of substrate 302, first electrode 304, second electrode 306, and structured dielectric layer 308. First electrode 304 includes segmented lines of conductive material interposed between segmented lines of conductive material of second electrode 306. The width of each segmented line of first electrode 304 is less than the width of each segmented line of second electrode 306. In this embodiment, dielectric layer 308 is structured to include trench recess regions 305 exposing lines of segmented first electrode 304 and dot recess regions 307 exposing dots of segmented second electrode 306. In this embodiment, there are three dot recess regions 307 spaced apart across each line segment of second electrode 306.

Figure 13A:
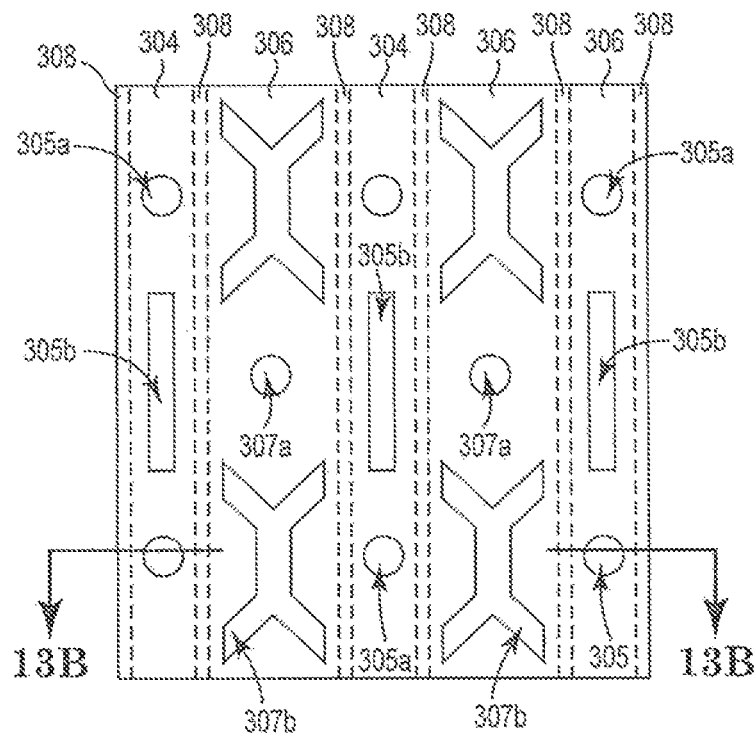
FIG. 13A illustrates a top view of another embodiment of the substrate, the first electrode, the second electrode, and the structured dielectric layer.
Figure 13B:
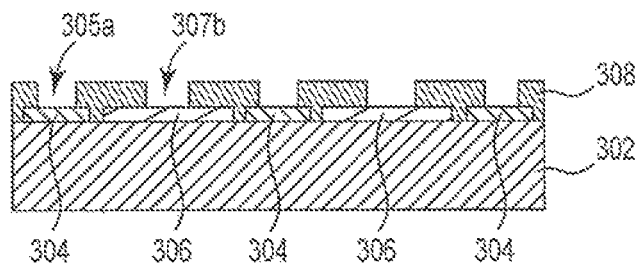
FIG. 13B illustrates a cross-sectional view of another embodiment of the substrate, the first electrode, the second electrode, and the structured dielectric layer.

FIG. 13A illustrates a top view and FIG. 13B illustrates a cross-sectional view of another embodiment of substrate 302, first electrode 304, second electrode 306, and structured dielectric layer 308. First electrode 304 includes segmented lines of conductive material interposed between segmented lines of conductive material of second electrode 306. The width of each segmented line of first electrode 304 is less than the width of each segmented line of second electrode 306.

In this embodiment, dielectric layer 308 is structured to include dot recess regions 305a exposing dots of segmented first electrode 304 and trench recess regions 305b exposing lines of segmented first electrode 304. Dot recess regions 305a are interposed between trench recess regions 305b. Dielectric layer 308 is also structured to include dot recess regions 307a exposing dots of segmented second electrode 306 and X-shaped recess regions 307b exposing X-shaped regions of segmented second electrode 306. Dot recess regions 307a are interposed between X-shaped recess regions 307b. Dot recess regions 307a are substantially centered between trench recess regions 305b, and dot recess regions 305a are substantially centered between X-shaped recess regions 307b.

While various shapes of the recessed regions on the dielectric layer have been illustrated and described above, the shape of the recessed regions on the dielectric layer can include any suitable combination of zero, one, or two dimensional shapes on the electrodes. The shapes optimize the movement of charged colorant particles among the electrodes to provide the optimal compaction and spreading of the colorant particles. Therefore, the present disclosure is not limited to the specific embodiments described herein.

Figure 14A:
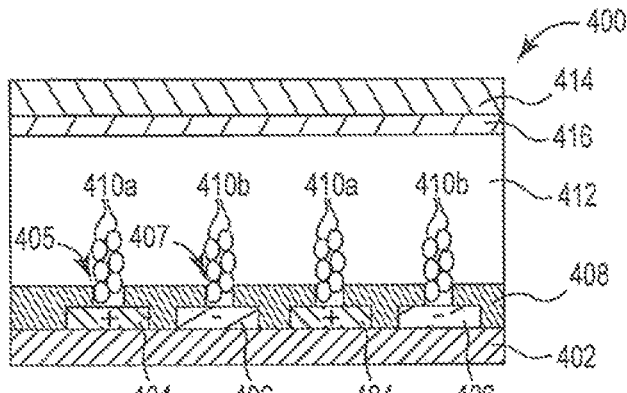
FIG. 14A illustrates a cross-sectional view of one embodiment of a clear optical state of an electro-optical display element.

FIG. 14A illustrates a cross-sectional view of one embodiment of a clear optical state of an electro-optical display element 400. Electro-optical display element 400 includes a first substrate 402, a first electrode 404, a second electrode 406, a dielectric layer 408 including recess regions 405 and 407, charged colorant particles 410a and 410b, a display volume 412, a third electrode 416, and a second substrate 414.

Charged colorant particles 410a and 410b in dual colorant ink are oppositely charged and each provides a different color, such as cyan and magenta. Colorants in dual colorant ink can be any combination of primary subtractive or additive colorants, such as cyan, magenta, yellow, black, red, green, blue, and white. In this embodiment, first electrode 404 is a segmented electrode formed on substrate 402 and second electrode 406 is a segmented electrode formed on substrate 402 similar to electro-optical display element 300 previously described and illustrated with reference to FIGS. 8A-8C. A dielectric layer is formed on substrate 402, first electrode 404, and second electrode 406 and structured to provide dielectric layer 408. Dielectric layer 408 is structured with recess regions 405 that allow charged colorant particles 410a to compact on first electrode 404 and recess regions 407 that allow charged colorant particles 410b to compact on second electrode 406.

Third electrode 416 is formed on second substrate 416 and is separated from first electrode 404 and second electrode 408 by the display volume 412. Third electrode 416 includes a transparent conductive material, such as carbon nanotube layers, a transparent conducting oxide such as ITO (Indium Tin Oxide), or a transparent conducting polymer such as PEDOT (poly 3,4-ethylenedioxythiophene). Third electrode 416 is used in combination with first electrode 404 and second electrode 406 to enable grayscale optical states with dual colorant ink. In another embodiment, third electrode 416 is a segmented electrode.

To switch display element 400 to a clear optical state, a positive bias or voltage signal is applied to first electrode 404, a negative bias or voltage signal is applied to second electrode 406, and a reference bias or ground signal is applied to third electrode 416. This results in a clearing of the main aperture of display element 400 by compacting negatively charged colorant particles 410a in recess regions 405 of dielectric layer 408 and compacting positively charged colorant particles 410b in recess regions 407 of dielectric layer 408. In the clear optical state, negatively charged colorant particles 410a are electrophoretically and convectively moved to first electrode 404 and held there by the positive bias or voltage signal on first electrode 404, and positively charged colorant particles 410b are electrophoretically and convectively moved to second electrode 406 and held there by the negative bias or voltage signal on second electrode 406.

For dual colorant ink, once each colorant is compacted to their respective first and second electrodes, one or both colorants can be held on the electrodes with the proper bias. While holding colorant particles of one polarity using recessed dots in the dielectric layer, the other electrode can be modulated to produce a grayscale optical state for colorant particles of the other polarity. Pulse width and/or amplitude modulation between the first electrode and the third electrode controls colorant particles of one polarity while pulse width and/or amplitude modulation between the second electrode and the third electrode controls colorant particles of the other polarity.

Figure 14B:
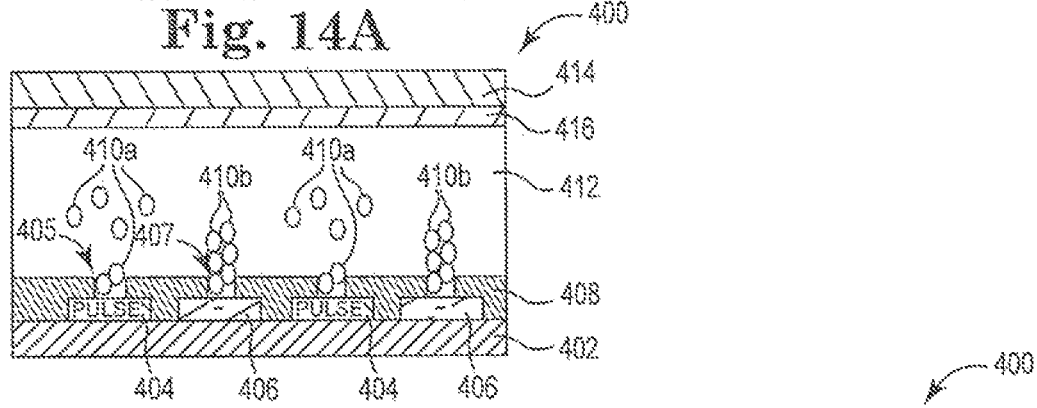
FIG. 14B illustrates a cross-sectional view of one embodiment of a first grayscale optical state of an electro-optical display element.

FIG. 14B illustrates a cross-sectional view of one embodiment of a first grayscale optical state of electro-optical display element 400. In this embodiment, the voltage between first electrode 404 and third electrode 416 is modulated by pulsing first electrode 404 between zero or a slightly negative voltage and a positive voltage to produce a grayscale optical state using colorant particles 410a. A negative bias or voltage signal on second electrode 406 holds positively charged colorant particles 410b compacted in recess regions 407 of dielectric layer 408.

Figure 14C:
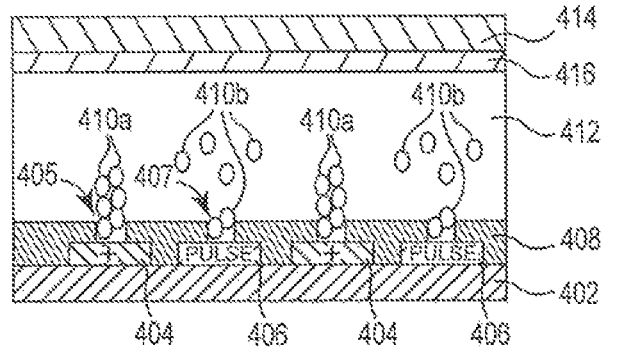
FIG. 14C illustrates a cross-sectional view of one embodiment of a second grayscale optical state of an electro-optical display element.

FIG. 14C illustrates a cross-sectional view of one embodiment of a second grayscale optical state of electro-optical display element 400. In this embodiment, the voltage between second electrode 406 and third electrode 416 is modulated by pulsing second electrode 404 between zero or a slightly positive voltage and a negative voltage to produce a grayscale optical state using colorant particles 410b. A positive bias or voltage signal on first electrode 404 holds negatively charged colorant particles 410a compacted in recess regions 405 of dielectric layer 408.

Figure 14D:
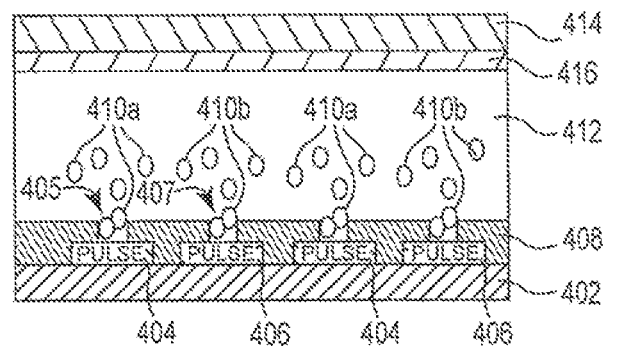
FIG. 14D illustrates a cross-sectional view of one embodiment of a third grayscale optical state of an electro-optical display element.

FIG. 14D illustrates a cross-sectional view of one embodiment of a third grayscale optical state of electro-optical display element 400. In this embodiment, the voltage between first electrode 404 and third electrode 416 is modulated by pulsing first electrode 404 between zero volts and a positive voltage to produce a grayscale optical state using colorant particles 410a. In addition, the voltage between second electrode 406 and third electrode 416 is modulated by pulsing second electrode 406 between zero volts and a negative voltage to produce a grayscale optical state using colorant particles 410b. Colorant particles 410a and 410b may be mixed to produce a third color different from the color of colorant particles 410a and the color of colorant particles 410b.

Figure 15A:
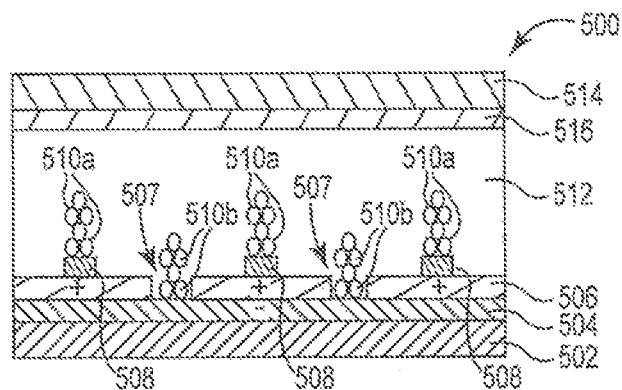
FIG. 15A illustrates a cross-sectional view of one embodiment of a clear optical state of an electro-optical display element.

FIG. 15A illustrates a cross-sectional view of one embodiment of a clear optical state of an electro-optical display element 500. Electro-optical display element 500 includes a first substrate 502, a first electrode 504, a dielectric layer 506 including recess regions 507, a second electrode 508, charged colorant particles 510a and 510b, a display volume 512, a third electrode 516, and a second substrate 514.

Charged colorant particles 510a and 510b in dual colorant ink are oppositely charged and each provides a different color, such as cyan and magenta. In this embodiment, first electrode 504 is a continuous, blanket, or solid plate electrode formed on substrate 502 and second electrode 508 is a segmented or lattice patterned electrode formed on dielectric layer 506 similar to electro-optical display element 200 previously described and illustrated with reference to FIGS. 2A-2C. A dielectric layer is formed on first electrode 504 and structured to provide dielectric layer 506. Dielectric layer 506 is structured with recess regions 507 that allow charged colorant particles 510b to compact on first electrode 504. Charged colorant particles 510a are allowed to compact on second electrode 508.

Third electrode 516 is formed on second substrate 516 and is separated from first electrode 504 and second electrode 508 by the display volume 512. Third electrode 516 includes a transparent conductive material, such as carbon nanotube layers, a transparent conducting oxide such as ITO (Indium Tin Oxide), or a transparent conducting polymer such as PEDOT (poly 3,4-ethylenedioxythiophene). Third electrode 516 is used in combination with first electrode 504 and second electrode 506 to enable grayscale optical states with dual colorant ink. In another embodiment, third electrode 516 is a segmented electrode.

To switch display element 500 to a clear optical state, a negative bias or voltage signal is applied to first electrode 504, a positive bias or voltage signal is applied to second electrode 508, and a reference bias or ground signal is applied to third electrode 516. This results in a clearing of the main aperture of display element 500 by compacting negatively charged colorant particles 510a on second electrode 508 and compacting positively charged colorant particles 510b in recess regions 507 of dielectric layer 506. In the clear optical state, negatively charged colorant particles 510a are electrophoretically and convectively moved to second electrode 508 and held there by the positive bias or voltage signal on second electrode 508, and positively charged colorant particles 510b are electrophoretically and convectively moved to first electrode 504 and held there by the negative bias or voltage signal on first electrode 504.

Figure 15B:
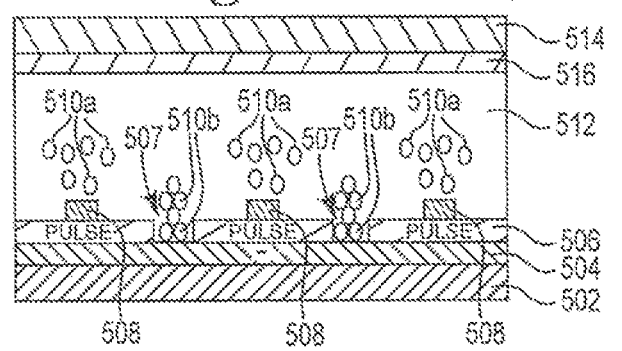
FIG. 15B illustrates a cross-sectional view of one embodiment of a first grayscale optical state of an electro-optical display element.

FIG. 15B illustrates a cross-sectional view of one embodiment of a first grayscale optical state of electro-optical display element 500. In this embodiment, the voltage between second electrode 508 and third electrode 516 is modulated by pulsing second electrode 508 between zero or a slightly negative voltage and a positive voltage to produce a grayscale optical state using colorant particles 510a. A negative bias or voltage signal on first electrode 504 holds positively charged colorant particles 510b compacted in recess regions 507 of dielectric layer 506.

Figure 15C:
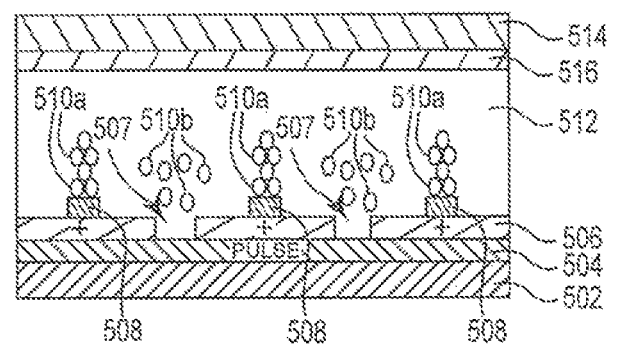
FIG. 15C illustrates a cross-sectional view of one embodiment of a second grayscale optical state of an electro-optical display element.

FIG. 15C illustrates a cross-sectional view of one embodiment of a second grayscale optical state of electro-optical display element 500. In this embodiment, the voltage between first electrode 504 and third electrode 516 is modulated by pulsing first electrode 504 between zero or a slightly positive voltage and a negative voltage to produce a grayscale optical state using colorant particles 510b. A positive bias or voltage signal on second electrode 508 holds negatively charged colorant particles 510a compacted on second electrode 508.

Figure 15D:
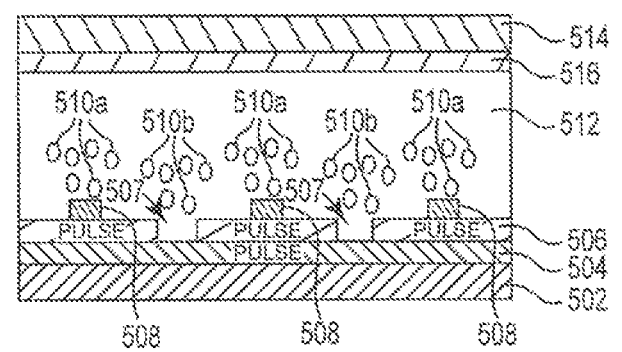
FIG. 15D illustrates a cross-sectional view of one embodiment of a third grayscale optical state of an electro-optical display element.

FIG. 15D illustrates a cross-sectional view of one embodiment of a third grayscale optical state of electro-optical display element 500. In this embodiment, the voltage between second electrode 508 and third electrode 516 is modulated by pulsing second electrode 508 between zero volts and a positive voltage to produce a grayscale optical state using colorant particles 510a. In addition, the voltage between first electrode 504 and third electrode 516 is modulated by pulsing first electrode 504 between zero volts and a negative voltage to produce a grayscale optical state using colorant particles 510b. Colorant particles 510a and 510b may be mixed to produce a third color different from the color of colorant particles 510a and the color of colorant particles 510b.

While FIGS. 14 and 15 illustrates embodiments including a third electrode to control each colorant independently in dual colorant ink, single colorant ink can also operate in a similar manner by the voltage applied to the first or second electrode relative to the third electrode at reference bias condition.

Figure 16A:
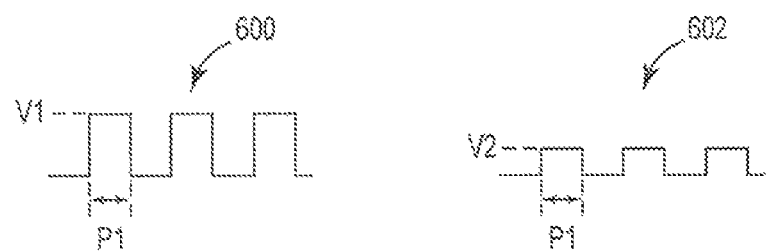
FIG. 16A illustrates one embodiment of signals for setting the optical state of an electro-optical display element.

FIG. 16A illustrates one embodiment of signals for setting the optical state of an electro-optical display element. Signals 600 and 602 can be used to set the optical state of an electro-optical display element, such as a display element 200 previously described and illustrated with reference to FIGS. 2A-2C, a display element 300 previously described and illustrated with reference to FIGS. 8A-8C, a display element 400 previously described and illustrated with reference to FIGS. 14A-14D, a display element 500 previously described and illustrated with reference to FIGS. 15A-15D, or another suitable display element.

In this embodiment, amplitude modulation is used to set the optical state of an electro-optical display element. Signal 600 includes a pulse signal having a first amplitude (V1) and a first pulse width (P1). Signal 602 includes a pulse signal having a second amplitude (V2) and the first pulse width (P1). The second amplitude (V2) is less than the first amplitude (V1) such that signal 600 induces a lighter grayscale state than signal 602 when applied between two electrodes within an electro-optical display element. By adjusting the amplitude of the pulse signal applied between two electrodes within an electro-optical display element while maintaining a constant pulse width, any suitable number of grayscale levels can be achieved.

Figure 16B:
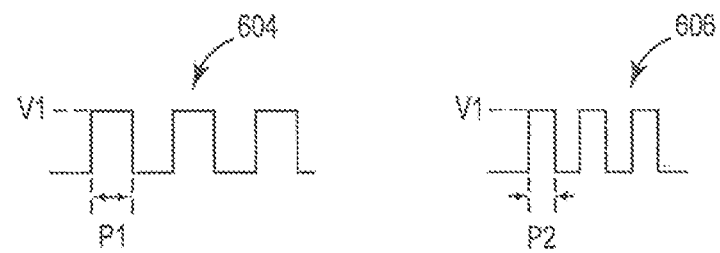
FIG. 16B illustrates another embodiment of signals for setting the optical state of an electro-optical display element.

FIG. 16B illustrates another embodiment of signals for setting the optical state of an electro-optical display element. Signals 604 and 606 can be used to set the optical state of an electro-optical display element, such as a display element 200 previously described and illustrated with reference to FIGS. 2A-2C, a display element 300 previously described and illustrated with reference to FIGS. 8A-8C, a display element 400 previously described and illustrated with reference to FIGS. 14A-14D, a display element 500 previously described and illustrated with reference to FIGS. 15A-15D, or another suitable display element.

In this embodiment, pulse width modulation is used to set the optical state of an electro-optical display element. Signal 604 includes a pulse signal having a first amplitude (V1) and a first pulse width (P1). Signal 606 includes a pulse signal having the first amplitude (V1) and a second pulse width (P2). The second pulse width (P2) is less than the first pulse width (P1) such that signal 604 induces a lighter grayscale state than signal 606 when applied between two electrodes within an electro-optical display element. By adjusting the pulse width of the pulse signal applied between two electrodes within an electro-optical display element while maintaining a constant amplitude, any suitable number of grayscale levels can be achieved. In other embodiments, a combination of amplitude modulation and pulse width modulation is used to set the optical state of an electro-optical display element.

Embodiments provide electro-optical display elements including in-plane electrodes with a dielectric layer between the electrodes. The embodiments allow the use of various electric field configurations such as fringe field and in-plane switching fields to optimize the movement of charged colorant particles. The potential applied between the two electrodes can be used to control grayscale in addition to the compaction of the colorant particles. Electro-convective flow initiated by electrophoretic force in the embodiments can speed up the in-plane movement of colorant particles compared to conventional electro-optical display elements. In addition, the two electrode structure can provide three states (i.e., two clear states and one dark or spread state). Also, since both electrodes are defined on the same plane or substrate, the top layer of the display element can be a plastic sheet, which may simplify the assembly process. The need for a top transparent conductor may also be eliminated, which reduces absorption due to the transparent conductor and improves optical contrast.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display element comprising:
a first electrode;
a dielectric layer disposed on the first electrode, the dielectric layer having recessed regions therein to expose the first electrode;
a second electrode disposed on the dielectric layer; and
a fluid with colorant particles within the display element,
wherein a voltage signal applied to the first electrode and the second electrode controls movement of the colorant particles such that a first voltage signal provides a first optical state by compacting the colorant particles into the recessed regions and a second voltage signal provides a second optical state by spreading the colorant particles in the fluid.

2. The display element of claim 1, wherein a third voltage signal provides a third optical state by compacting the colorant particles onto the second electrode.

3. The display element of claim 1, wherein the first electrode comprises a continuous electrode, and
wherein the second electrode comprises a segmented or lattice patterned electrode.

4. The display element of claim 1, further comprising:
a third electrode opposite the first and second electrodes,
wherein the fluid is between the third electrode and the first and second electrodes.

5. The display element of claim 4, wherein the colorant particles comprise colorant particles of two different colors, the different colored colorant particles having opposite polarities.

6. A display element comprising:
a substrate;
a first electrode disposed on a first portion of the substrate;
a second electrode disposed on a second portion of the substrate;
a dielectric layer having recessed regions therein, the dielectric layer disposed on a remaining portion of the substrate and on the first and second electrodes, the recessed regions being over the first and second electrodes to expose the first electrode and the second electrode; and
a fluid with colorant particles within the display element,
wherein a voltage signal applied to the first electrode and the second electrode controls movement of the colorant particles such that a first voltage signal provides a first optical state by compacting the colorant particles into recessed regions over the first electrode and a second voltage signal provides a second optical state by spreading the colorant particles in the fluid.

7. The display element of claim 6, wherein a third voltage signal provides a third optical state by compacting the colorant particles into recessed regions over the second electrode.

8. The display element of claim 6, wherein the first electrode comprises a segmented electrode, and
wherein the second electrode comprises a segmented electrode.

9. The display element of claim 6, further comprising:
a third electrode opposite the substrate,
wherein the fluid is between the third electrode and the first and second electrodes.

10. The display element of claim 9, wherein the colorant particles comprise colorant particles of two different colors, the different colored colorant particles having opposite polarities.

11. A method for operating an electro-optical display, the method comprising:
providing an electro-optical display element comprising a first electrode and a second electrode contacting a dielectric layer, the dielectric layer separating the first electrode from the second electrode and exposing one or both of the first electrode and the second electrode in recessed regions of the dielectric layer, and the display element comprising a fluid with colorant particles;
applying a first voltage signal to the first electrode to compact the colorant particles on the first electrode to provide a first optical state;
applying a second voltage signal to the second electrode to compact the colorant particles on the second electrode to provide a second optical state; and
applying a third voltage signal to at least one of the first electrode and the second electrode to spread the colorant particles in the fluid to provide a third optical state.

12. The method of claim 11, wherein providing the electro-optical display element comprises providing a third electrode separated from the first electrode and the second electrode by the fluid, the method further comprising:
applying a reference or ground signal to the third electrode.

13. The method of claim 11, wherein applying the third voltage signal comprises applying a pulse width modulated signal to the first electrode to provide a grayscale optical state having a grayscale level based on the pulse width.

14. The method of claim 11, wherein applying the third voltage signal comprises applying an amplitude modulated signal to the first electrode to provide a grayscale optical state having a grayscale level based on the amplitude.

15. The method of claim 11, wherein providing the electro-optical display element comprises providing a segmented first electrode and a segmented second electrode, wherein applying the first voltage signal comprises applying the first voltage signal to selected segments of the first electrode, wherein applying the second voltage signal comprises applying the second voltage signal to selected segments of the second electrode, and wherein applying the third voltage signal comprises applying the third voltage signal to selected segments of at least one of the first electrode and the second electrode.

16. The display element of claim 1, wherein the first optical state is a clear optical state, and the second optical state is a dark optical state.

17. The display element of claim 1, wherein the second electrode has a hexagonal shape, and a portion of the first electrode exposed by a recessed region of the recessed regions is enclosed by the second electrode.

18. The display element of claim 1, wherein the second electrode has a rectangular shape, and a portion of the first electrode exposed by a recessed region of the recessed regions is enclosed by the second electrode.

\* \* \* \* \*

UNITED STATES PATENT AND TRADEMARK OFFICE
CERTIFICATE OF CORRECTION

Page 1 of 1

PATENT NO. : 9,217,906 B2
APPLICATION NO. : 13/258530
DATED : December 22, 2015
INVENTOR(S) : Jong-Souk Yeo et al.

It is certified that error appears in the above-identified patent and that said Letters Patent is hereby corrected as shown below:

Drawings
In sheet 12 of 15, Fig. 13A, line 6, delete "305" and insert -- 305a --, therefor.

Signed and Sealed this
Nineteenth Day of April, 2016

Michelle K. Lee
*Director of the United States Patent and Trademark Office*